US006269620B1

United States Patent
Kasanic et al.

(10) Patent No.: US 6,269,620 B1
(45) Date of Patent: Aug. 7, 2001

(54) IMPLEMENT ATTACHMENT APPARATUS AND METHOD (75) Inventors: Joe Kasanic, Medina; Al Borling, Valley City, both of OH (US)

(73) Assignee: MTD Products INC, Cleveland, OH (US)

( * ) Notice: Subject to any disclaimer, the term of this patent is extended or adjusted under 35 U.S.C. 154(b) by 0 days.

(21) Appl. No.: 09/349,062

(22) Filed: Jul. 8, 1999

Related U.S. Application Data (60) Provisional application No. 60/092,421, filed on Jul. 10, 1998.

(51) Int. Cl.⁷ .................................................. A01D 61/00
(52) U.S. Cl. ........................... 56/16.6; 280/785; 280/769
(58) Field of Search .............................. 56/194, 196, 197, 56/199, 329, 16.6, 228; 280/785, 769; 293/117, 155, 154; 224/512, 516, 547; 248/200; 403/363, 375, 116, 163, 161

(56) References Cited

U.S. PATENT DOCUMENTS

| Re. 35,700 | * | 12/1997 | Watson et al. ........................ 37/231 |
| 3,039,634 | * | 6/1962 | Hobson et al. ...................... 224/516 |
| 3,588,147 | | 6/1971 | Enters ................................. 280/481 |
| 3,623,744 | * | 11/1971 | Bertness ............................. 280/106 |
| 3,708,189 | * | 1/1973 | Good .................................. 287/100 |
| 4,193,621 | * | 3/1980 | Peich et al. ......................... 293/142 |
| 4,386,871 | * | 6/1983 | Hooker et al. ...................... 403/377 |
| 4,532,756 | | 8/1985 | Merkel ................................. 56/202 |
| 4,541,230 | * | 9/1985 | Huerter ................................ 56/193 |
| 4,580,811 | * | 4/1986 | Wykhuis et al. .................... 280/759 |
| 4,697,948 | * | 10/1987 | Fukuda ................................ 403/71 |
| 4,750,753 | * | 6/1988 | Dezern ............................ 280/164 R |
| 4,838,593 | * | 6/1989 | Fleming et al. ..................... 293/126 |
| 5,029,668 | * | 7/1991 | Murakawa et al. ................. 181/240 |
| 5,036,607 | * | 8/1991 | Taylor ............................... 37/118 A |
| 5,190,218 | * | 3/1993 | Kayser et al. ....................... 239/172 |
| 5,205,600 | * | 4/1993 | Moore ............................. 294/82.27 |
| 5,244,335 | * | 9/1993 | Johns .................................. 414/537 |
| 5,333,702 | * | 8/1994 | Gaffney et al. ..................... 180/208 |
| 5,439,151 | * | 8/1995 | Clayton .............................. 224/509 |
| 5,478,124 | * | 12/1995 | Warrington et al. ................ 293/125 |
| 5,828,547 | * | 10/1998 | Francovich et al. ................ 361/685 |
| 5,949,645 | * | 9/1999 | Aziz et al. ........................... 361/695 |
| 6,098,739 | * | 6/1998 | Anderson et al. .................. 180/312 |

FOREIGN PATENT DOCUMENTS

| 2109067 | 2/1972 | (AU) ..................................... 32/21 |
| 29719381 | 7/1998 | (DE) ..................................... 34/12 |
| 2182834 | 5/1987 | (GB) . |
| 403258629 | * | 11/1991 | (JP) ................................... 224/547 |

* cited by examiner

Primary Examiner—Robert E. Pezzuto
Assistant Examiner—Árpád Fábián Kovács
(74) Attorney, Agent, or Firm—Emerson & Skeriotis; Roger D. Emerson; Timothy D. Bennett (57) ABSTRACT

An implement attachment apparatus is provided for use with a lawn and garden tractor and an implement. The implement has first and second attachment brackets having first and second holes and first and second slots respectively. The lawn and garden tractor includes a frame having first and second surfaces with first and second openings respectively. The tractor also includes a plurality of wheels operatively connected to the frame, an engine for use in providing locomotion to the plurality of wheels and, first and second extension members extending from the first and second surfaces of the frame. The implement attachment apparatus includes first and second pins as well as securing apparatus for securing the first and second pins in place. The first and second slots of the implement receive the first and second extension members respectively. The first and second holes of the implement and the first and second openings of the frame selectively receive the first and second pins respectively.

11 Claims, 8 Drawing Sheets

IMPLEMENT ATTACHMENT APPARATUS AND METHOD

This Utility Patent Application claims priority from Provisional Patent Application Serial No. 60/092,421 filed Jul. 10, 1998.

BACKGROUND OF THE INVENTION

1. Field of Invention

This invention pertains to the art of methods and apparatuses for attaching implements to a vehicle, and more specifically to methods and apparatuses for attaching implements to a lawn and garden tractor without the need for tools.

2. Description of the Related Art

It is well known to provide implements that can be attached to lawn and garden tractors. A vast range of implements including grass bags, plows, snow blowers, bumpers, etc. are commonly used. The implements may be attached at various places such as the front, the back, and the midsection of the lawn and garden tractor.

A problem well known in the art deals with the difficulty involved in attaching and detaching such implements. Typically, tools, such as wrenches, screw drivers, socket sets, hammers and the like, are required to secure the particular implement to the tractor. While such methods are effective, they require considerable time and energy.

The present invention provides methods and apparatuses for quickly and easily attaching and detaching implements without need of tools. The difficulties inherit in the art are therefore overcome in a way that is simple and efficient while providing better and more advantageous results.

SUMMARY OF THE INVENTION

According to one aspect of this invention, a lawn and garden tractor and implement are provided. An implement attachment apparatus is used to attach the implement to the lawn and garden tractor. The lawn and garden tractor includes a frame having first and second surfaces that are laterally spaced with first and second openings respectively, a plurality of wheels operatively connected to the frame, an engine operatively mounted to the frame for use in providing locomotion to at least one of the plurality of wheels, and a pair of extension members extending from the first and second surfaces of the frame. The implement includes a main body portion and first and second laterally spaced attachment brackets operatively connected to the main body and having first and second holes and first and second slots respectively. The first and second slots are adapted to receive the first and second extension members respectively. The implement attachment apparatus includes first and second pins and securing means for securing the first and second pins in place. The first and second holes in the implement and the first and second openings in the frame receive the first and second pins respectively.

According to another aspect of this invention, a method of attaching the implement to the lawn and garden tractor is provided. First the implement is positioned such that the first slot receives the first extension member and the second slot receives the second extension member. Then the implement is pivoted about the first and second extension members until the first hole in the implement is oriented concentrically with the first opening in the frame and the second hole in the implement is oriented concentrically with the second opening in the frame. Next, the first pin is inserted within the first hole in the implement and the first opening in the frame. Similarly, the second pin is inserted within the second hole in the implement and the second opening in the frame. Finally, the first and second pins are secured into place using cotter pins that fit within pin holes in the first and second pins.

According to still another aspect of this invention, another embodiment for attaching an implement to a lawn and garden tractor is provided. The lawn and garden tractor includes a frame having first, second and third surfaces. The third surface has an opening and the first and second surfaces are laterally spaced. The lawn and garden tractor also includes a plurality of wheels operatively connected to the frame, an engine operatively mounted to the frame for use in providing locomotion to at least one of the plurality of wheels, and first and second extension members extending from the first and second surfaces of the frame. The implement includes a main body portion and first, second and third attachment brackets operatively connected to the main body. The first and second attachment brackets are laterally spaced and have first and second slots respectively. The slots are adapted to receive the first and second extension members respectively. The third attachment bracket has a hole. The implement attachment apparatus includes a first pin and securing means for securing the first pin in place. The hole in the third attachment bracket and the opening in the third surface receive the first pin.

According to yet another aspect of this invention, a method of attaching the implement just described is provided. First, the implement is positioned such that the first slot receives the first extension member and the second slot receives the second extension member. Then, the implement is pivoted about the first and second extension members until the hole in the third attachment bracket is oriented concentrically with the opening in the third surface. Next, the first pin is inserted within the hole and the opening. Finally, the first pin is secured into place.

One advantage of the present invention is that it is easy to manufacture and can be made economically.

Another advantage of the present invention is that implements can be attached and detached without the use of tools.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
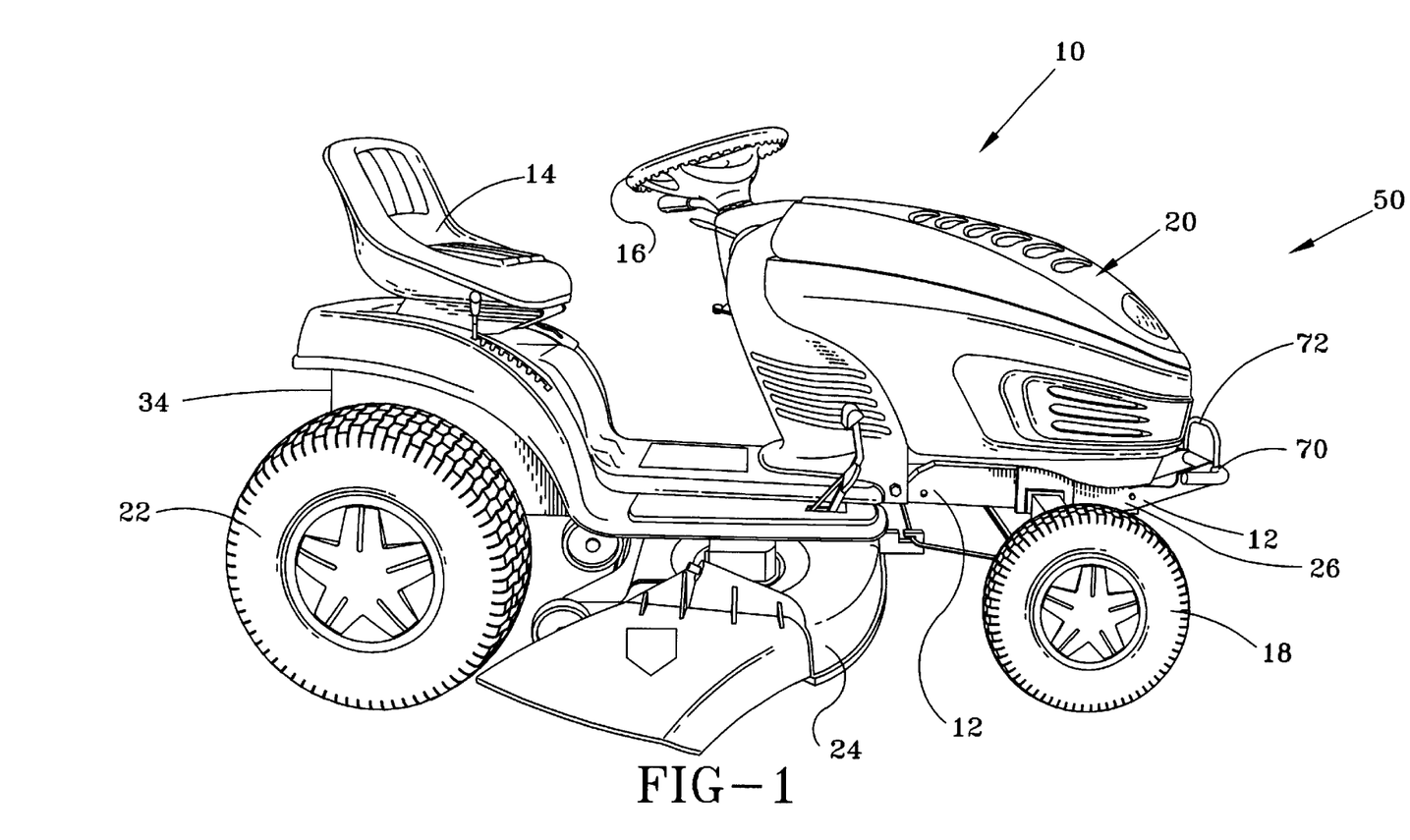
FIG. 1 is a left side elevation view of a lawn and garden tractor equipped with an implement attachment apparatus of the present invention.
Figure 2:
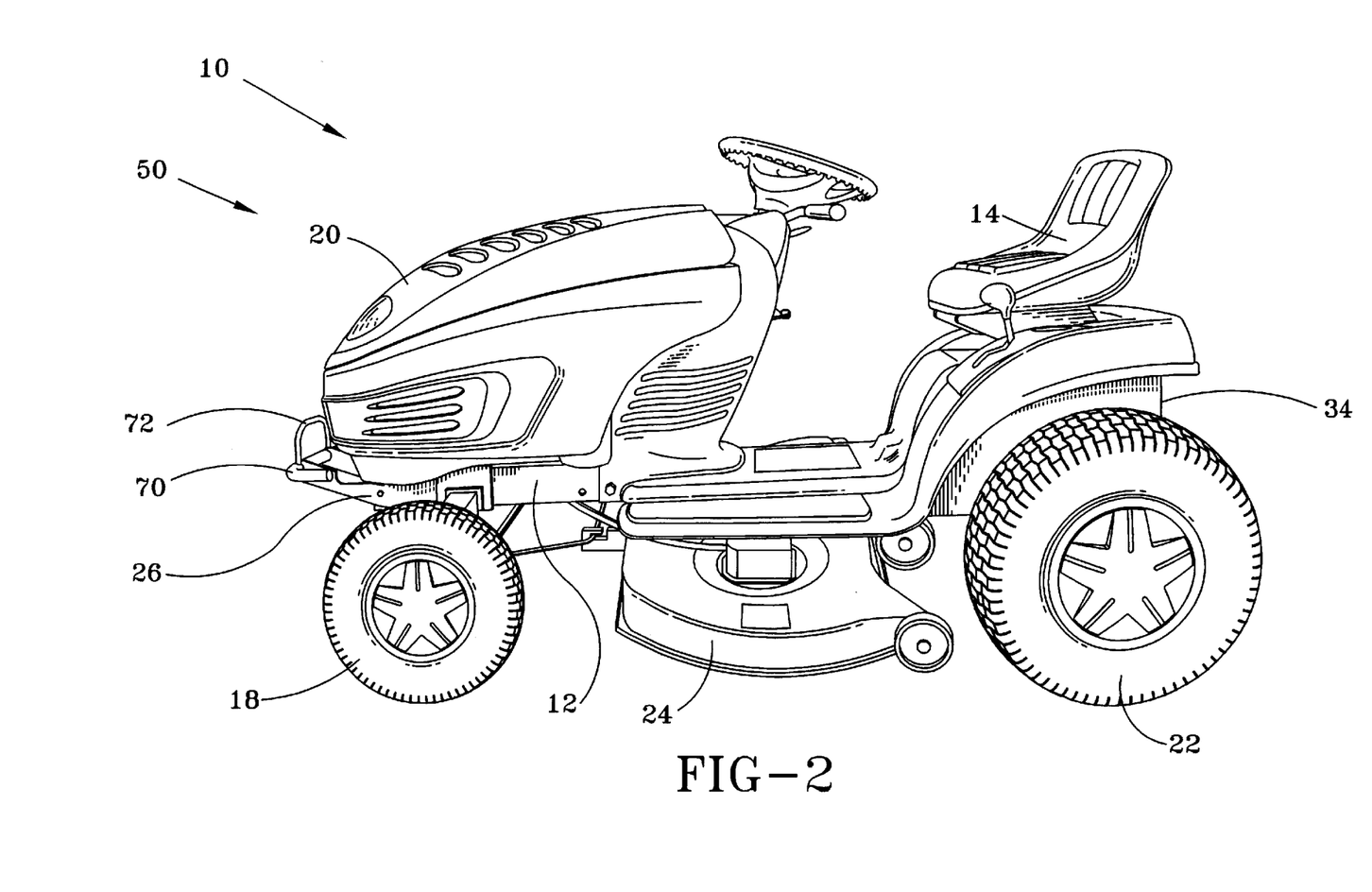
FIG. 2 is a right side elevation view of the lawn and garden tractor equipped with the implement attachment apparatus of the present invention.
Figure 3:
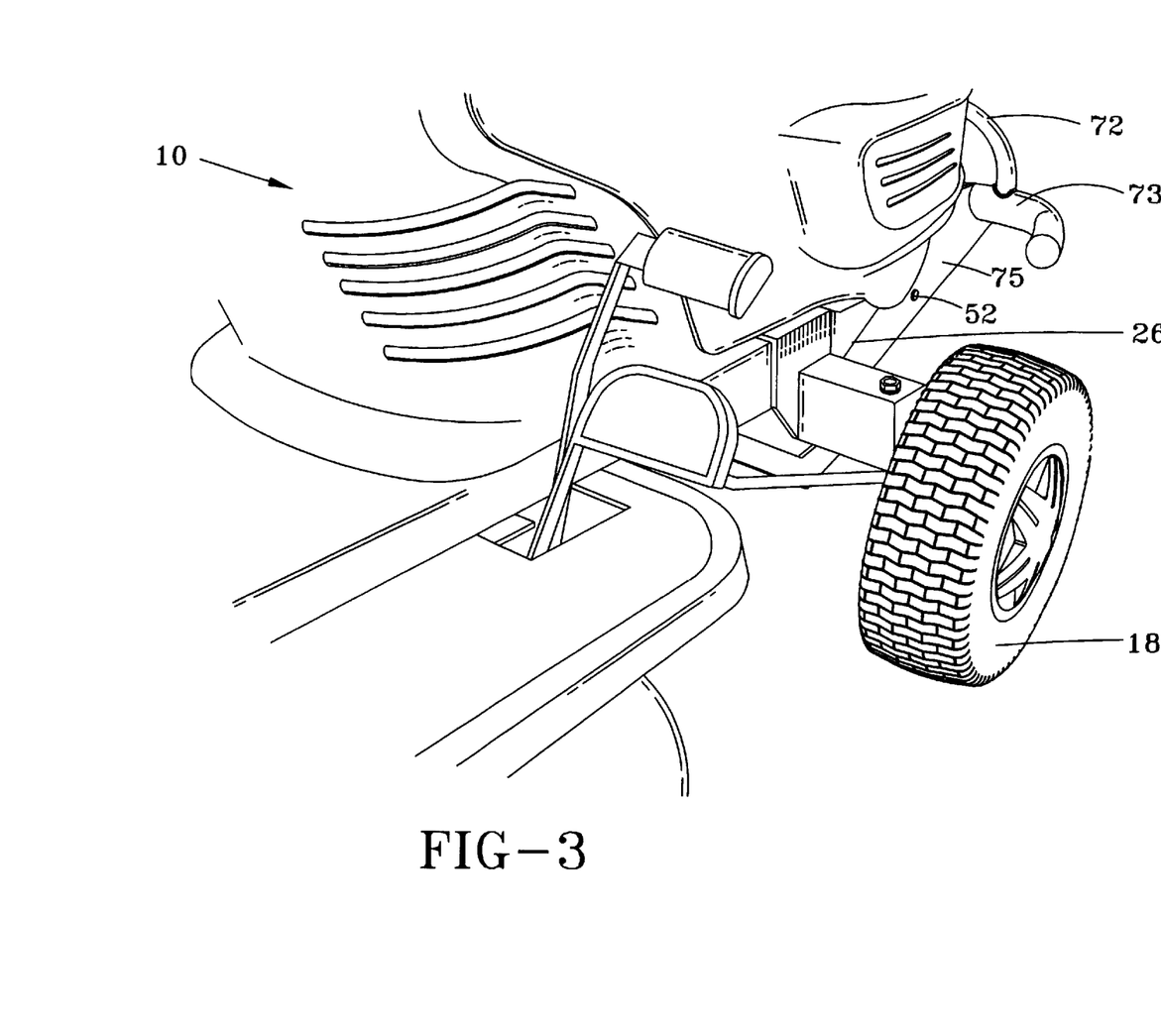
FIG. 3 is an exploded perspective left side view of the lawn and garden tractor looking forward and showing the front bumper attached to the front end of the frame.
Figure 4:
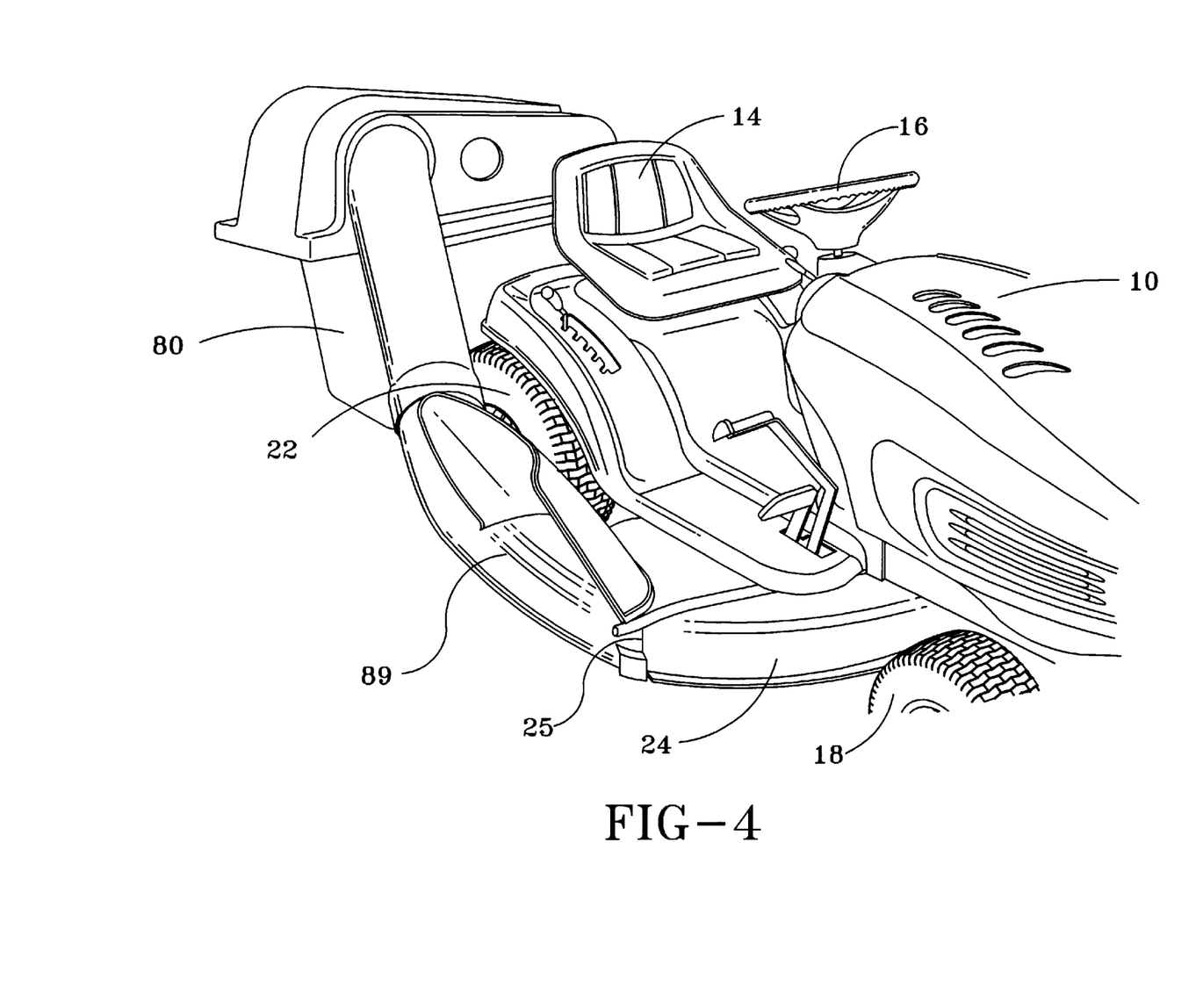
FIG. 4 is a perspective left side view of the lawn and garden tractor looking backward and showing the grass bag attached to the back end of the frame and to the mower deck.
Figure 5:
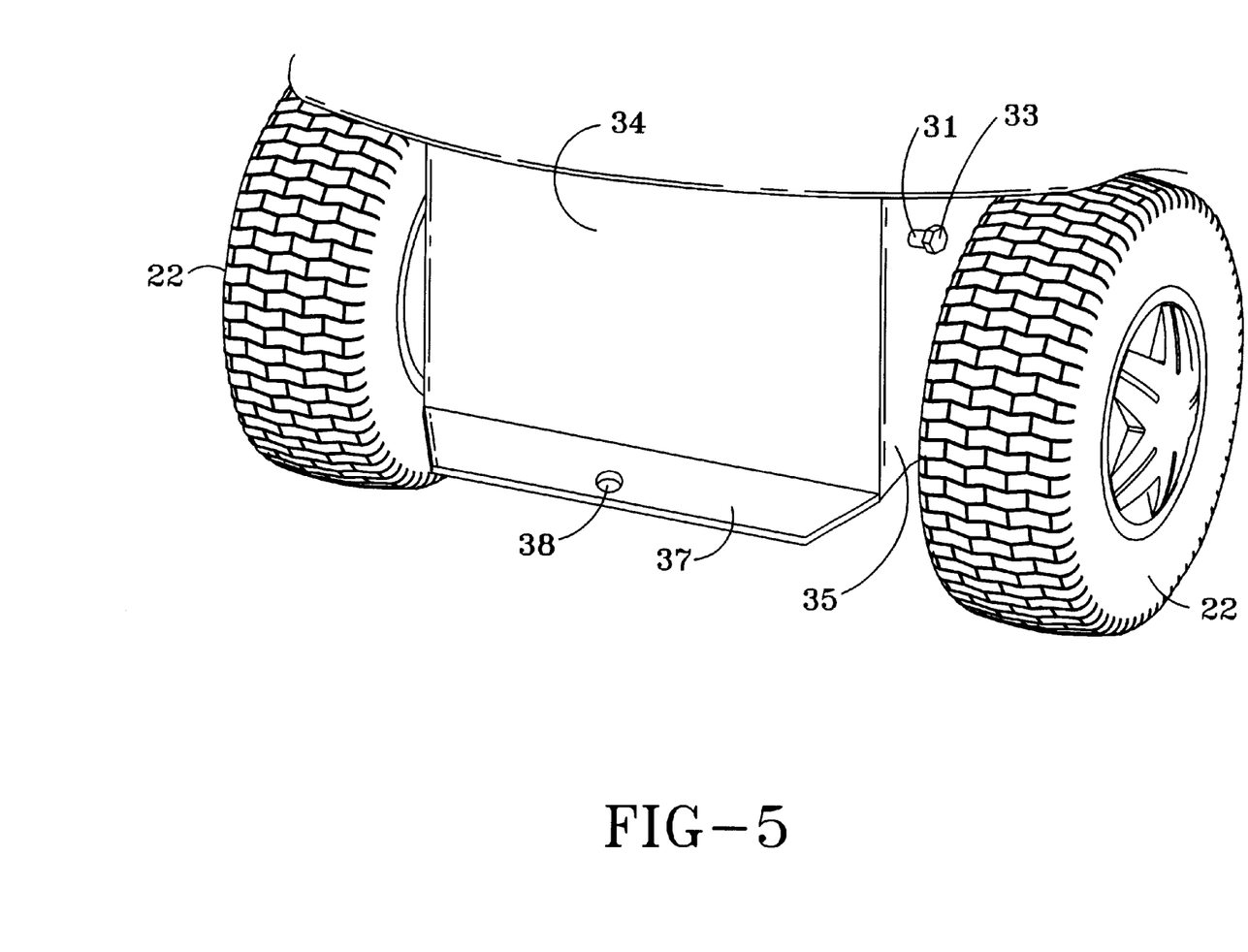
FIG. 5 is an exploded perspective back view of the lawn and garden tractor showing the back end of the frame with the extension member having a head.

Referring now to the drawings wherein the showings are for purposes of illustrating a preferred embodiment of the invention only and not for purposes of limiting the same, FIGS. 1–2 shows a lawn and garden tractor 10 that is equipped with an implement attachment apparatus 50 according to this invention. The implement attachment apparatus 50 is used in selectively attaching and detaching an implement 70. This preferred embodiment is directed to a lawn and garden tractor but the invention is applicable to other mowers, other vehicles, and other applications as well. It should be noted that the implement attachment apparatus 50 is intended for use with any appropriately equipped implement 70 such as bumpers, plows, grass bags, mowers, buckets, snow plows, etc. It should also be noted that the implement attachment apparatus 50 is useful with any appropriately equipped portion of the lawn and garden tractor 10. Different specific embodiments will be described below.

With continuing reference to FIGS. 1–2, the lawn and garden tractor 10 as shown includes a frame 12 having front and back ends 26, 34, an operator seat 14 and a steering mechanism 16 for steering front wheels 18. An engine 20, mounted to the frame 12, is used to drive back wheels 22 and to rotate one or more cutting blades (not shown) within a mower deck 24. The mower deck 24 is supported from the frame 12. The operation of the cutting blades is well known in the art and thus will not be discussed further in this specification.

Figure 6:
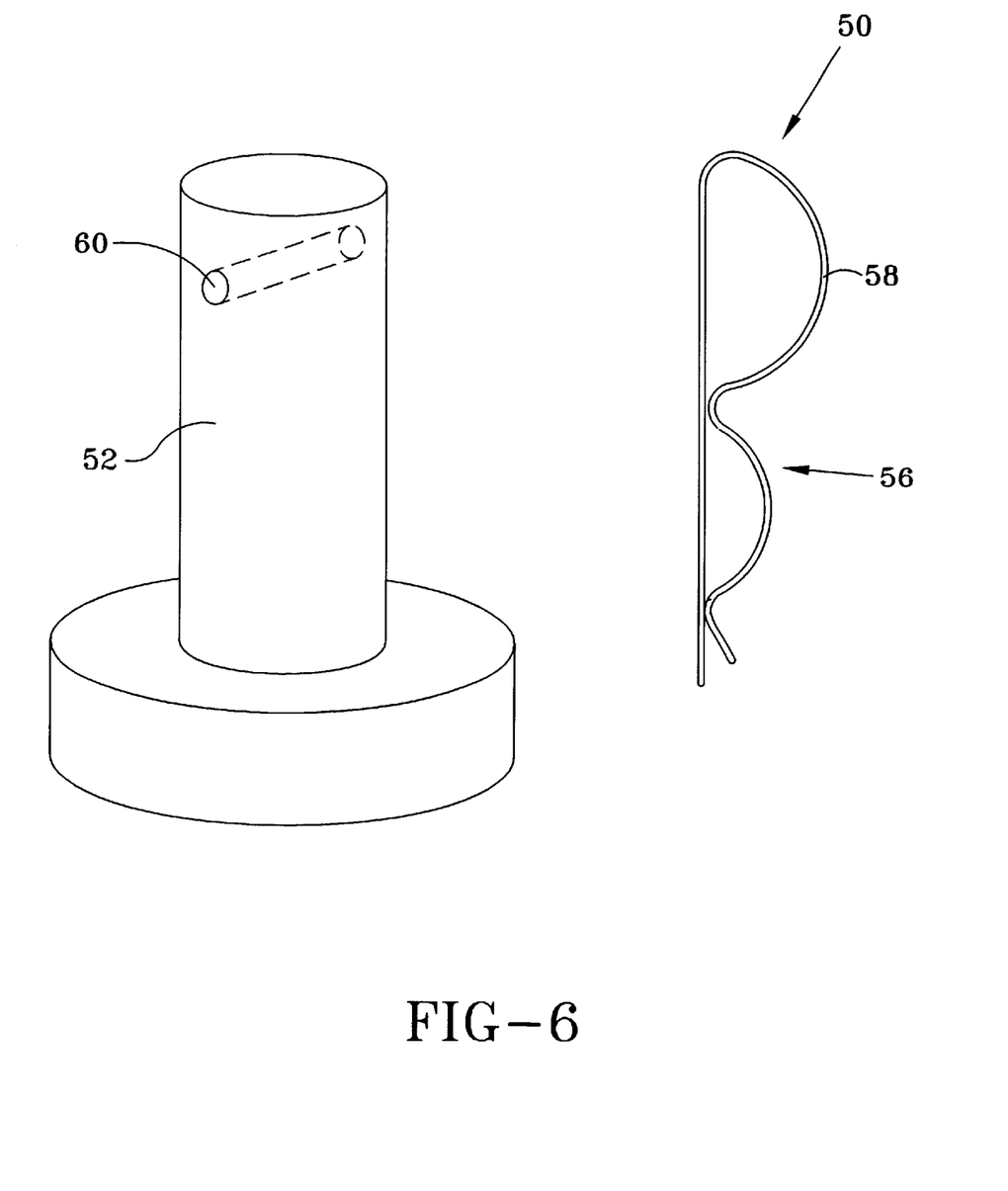
FIG. 6 is a perspective view of the pin and cotter pin used with the implement attachment apparatus of this invention.

With reference now to FIGS. 1–2 and 6, the implement attachment apparatus 50 includes one or more pins 52. These pins 52 may be formed of any material chosen with sound engineering judgment and may be shaped as desired. Preferably, the pins 52 are cylindrically shaped. Securing means 56 may be used to secure the pins 52 in place once they have been properly inserted. The securing means 56 can be of any type chosen with sound engineering judgment but in this preferred embodiment includes cotter pins 58 that fit within pin holes 60 as is commonly known in the art.

Figure 7:
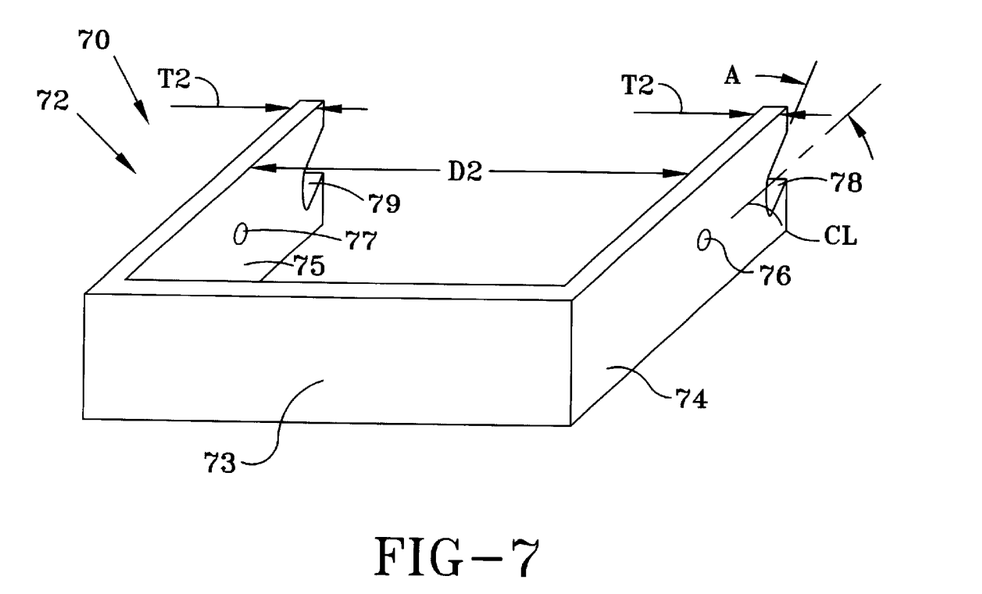
FIG. 7 is a perspective schematic representation of an implement showing the first and second attachment brackets.
Figure 8:
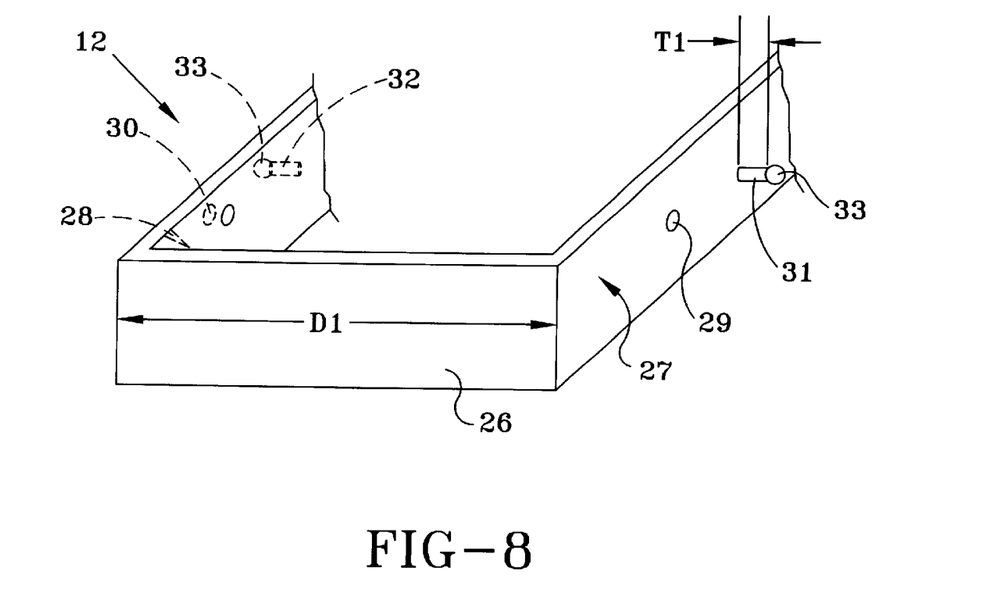
FIG. 8 is a perspective schematic representation of the front end of the frame showing the first and second extension members.

With reference now to FIGS. 1–3 and 7–8, a first embodiment will now be discussed. In this first embodiment, the implement 70 is a front bumper 72 that is selectively attachable to the front end 26 of the frame 12. The front end 26 has first and second surfaces 27, 28 each having first and second openings 29, 30 respectively. The first and second openings 29, 30 are shaped to receive the previously described pins 52. As shown, the first and second surfaces 27, 28 are substantially parallel and laterally spaced a distance D1. First and second extension members 31, 32 extend outwardly from the first and second surfaces 27, 28 respectively. Preferably the first and second extension members 31, 32 are substantially collinear and circular in cross section to permit the implement 70 to easily pivot about the first and second extension members 31, 32. It is also preferred that the first and second extension members 31, 32 have heads 33 that assist in maintaining the implement 70 in operative connection with the frame 12. As shown in FIG. 8, the extension members 31, 32 extend out from the surfaces 27, 28 a distance T1 before the heads 33 are positioned.

With continuing reference to FIGS. 1–3 and 7–8, the front bumper 72 includes a main body portion 73 operatively connected to first and second attachment brackets 74, 75. The first and second attachment brackets 74, 75 have first and second holes 76, 77 and first and second slots 78, 79 respectively. The holes 76, 77 are shaped to receive the previously described pins 52 and the slots 78, 79 are shaped to receive the previously described extension members 31, 32. It should be noted that though the slots 78, 79 are positioned at the distal ends of the attachment brackets 74, 75 and the holes 76, 77 are positioned between the main body portion 73 and the slots 78, 79, this particular arrangement is not necessary for this invention. It is also here contemplated that the slots 78, 79 could be positioned between the main body portion 73 and the holes 76, 77. The slots 78, 79 may be shaped and oriented in any manner chosen with sound engineering judgment. The orientation of the slots 78, 79 may be at an angle A with respect to a centerline CL of the attachment brackets 74, 75. Preferably angle A is between 5° and 60°. The slots 78, 79 may have a linear shape or a curvilinear shape. As shown in FIG. 7, the brackets 74, 75 have a thickness T2 in the area of the slots 78, 79. The inside surfaces of the first and second attachment brackets 74, 75 are preferably substantially parallel and are laterally spaced a distance D2 where distance D2 is substantially equal to distance D1. This provides for a snug fit of the implement 70 (in this case the front bumper 72) to the frame 12 (in this case the front end 26 of the frame 12).

Still referring to FIGS. 1–3 and 7–8, a method for attaching the front bumper 72 to the front end 26 of the frame 12 will now be discussed. First the inside surfaces of the first and second attachment brackets 74, 75 are positioned along the first and second surfaces 27, 28 of the frame 12 respectively. The front bumper 72 is then urged along the frame 12 till the first and second slots 78, 79 engage the first and second extension members 31, 32 respectively. By engage it is meant that the extension members 31, 32 are fully received within the first and second slots 78, 79 respectively. Preferably, the thickness T2 is less than or equal to the distance T1. When this is true, the attachment brackets 74, 75 fit between the heads 33 of the extension members 31, 32 and the first and second surfaces 27, 28 of the frame 12 and the heads 33 of the extension members 31, 32 extend outwardly beyond the first and second slots 78, 79. In this way, the heads 33 help to secure the implement 70 to the frame 12.

With continuing reference to FIGS. 1–3 and 7–8, the front bumper 72 is then pivoted about the first and second extension members 31, 32 until the first and second holes 76, 77 in the first and second attachment brackets 74, 75 are positioned concentrically with the first and second openings 29, 30 in the frame 12 respectively. This pivoting of the front bumper 72 may be either in the clockwise or counterclockwise direction, as shown in FIGS. 1–2, as preferred by the operator. One of the pins 52 is then inserted through the first hole 76 and the first opening 29. Similarly, another pin 52 is inserted through the second hole 77 and the second opening 30. Finally, the pins 52 are secured in place preferably by inserting the cotter pins 58 within the pin holes 60.

With continuing reference to FIGS. 1–3 and 7–8, to detach the front bumper 72 from the front end 26 of the frame 12, the cotter pins 58 are first removed from the pins 52. The first pin 52 is then removed from the first hole 76 and first opening 29. The second pin 52 is similarly removed from the second hole 77 and the second opening 30. Finally, the front bumper 72 is removed from the frame 12.

With reference now to FIGS. 1–2, 4–5 and 9–10, a second embodiment will now be discussed. In this second embodiment, the implement 70 is a grass bag 80 that is selectively attachable to the back end 34 of the frame 12. The back end 34 has first, second, and third surfaces 35, 36, 37. The third surface 37 has an opening 38 shaped to receive one of the previously described pins 52. As shown, the first and second outer surfaces 35, 36 are substantially parallel and laterally spaced a distance D3. The third surface 37 can be oriented with respect to the other surfaces 35, 36 in any manner chosen with sound engineering judgment. In the preferred embodiment shown, the third surface 37 is oriented at a substantially right angle with respect to the first and second surfaces 35, 36. First and second extension members 31, 32 extend from the first and second surfaces 35, 36 respectively. Preferably the first and second extension members 31, 32 are shaped and oriented as the previously described extension members on the front end 26 of the frame 12. Thus, the extension members 31, 32 extend outward from the surfaces 35,36 a distance T1 before heads 33 are positioned.

Figure 9:
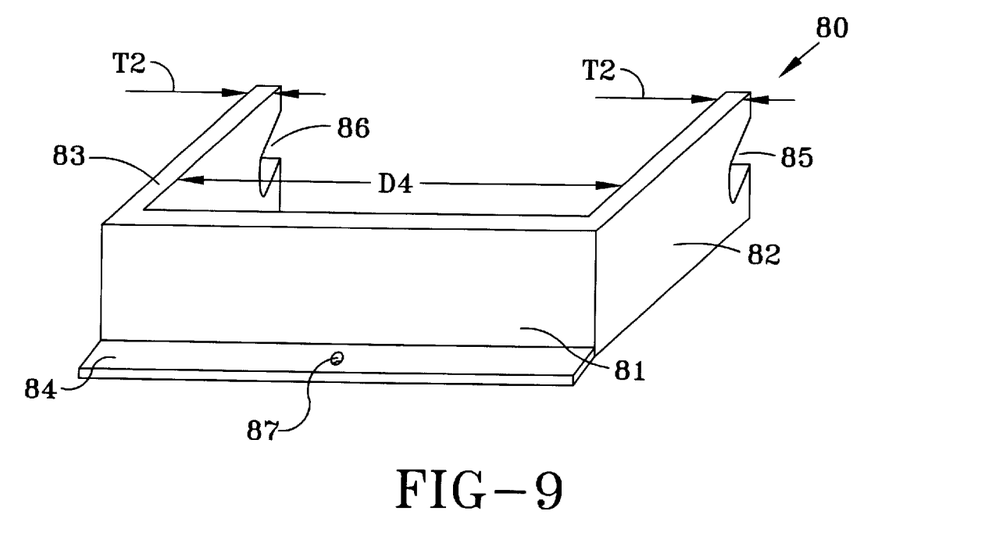
FIG. 9 is a perspective schematic representation of another implement showing the first, second and third attachment brackets.
Figure 10:
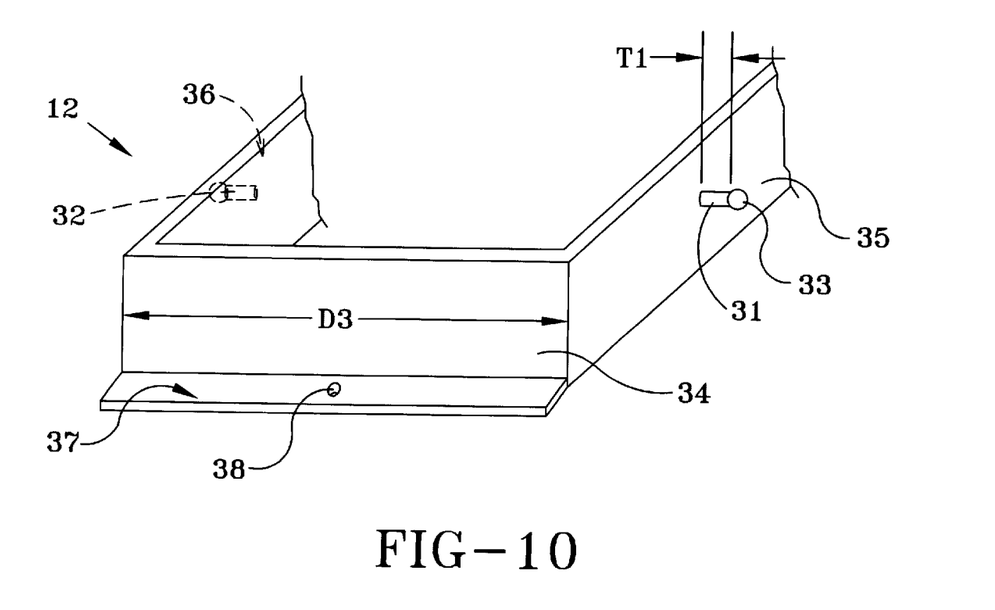
FIG. 10 is a perspective schematic representation of the back end of the frame showing the first, second and third surfaces.

With continuing reference to FIGS. 1–2, 4–5 and 9–10, the grass bag 80 includes a main body portion 81 operatively connected to first, second and third attachment brackets 82, 83, 84. The first and second attachment brackets 82, 83 have first and second slots 85, 86 respectively and the third attachment bracket 84 has a hole 87. The hole 87 is shaped to receive one of the previously described pins 52 and the slots 85, 86 are shaped to receive the previously described extension members 31, 32. The shape, orientation and position of the slots 85, 86 can vary as the slots 78, 79 discussed above. The inside surfaces of the first and second attachment brackets 82, 83 are preferably substantially parallel and are laterally spaced a distance D4 where distance D4 is substantially equal to distance D3. This provides for a snug fit of the implement 70 (in this case the grass bag 80) to the frame 12 (in this case the back end 34 of the frame 12). As shown in FIG. 9, the brackets 82,83 have a thickness T2 in the area of the slots 85, 86. The third attachment bracket 84 can be oriented with respect to the first and second attachment brackets 82, 83 in any manner chosen with sound engineering judgment. In the preferred embodiment shown, the third attachment bracket 84 is oriented at a substantially right angle with respect to the first and second attachment brackets 82, 83. It is most preferred that the third attachment bracket 84 be oriented to be substantially parallel to the third surface 37 of the frame 12 when the grass bag 80 is to be attached to the lawn and garden tractor 10.

Still referring to FIGS. 1–2, 4–5 and 9–10, a method for attaching the grass bag 80 to the back end 34 of the frame 12 will now be discussed. First the inside surfaces of the first and second attachment brackets 82, 83 are positioned along the first and second surfaces 35, 36 of the frame 12. The grass bag 80 is then urged along the frame 12 till the first and second slots 85, 86 engage the first and second extension members 31, 32 respectively. Preferably, the thickness T2 is less than or equal to the distance T1. When this is true, the attachment brackets 82,83 fit between the heads 33 of the extension members 31, 32 and the surfaces 35, 36 of the frame 12 and the heads 33 of the extension members 31, 32 extend outwardly beyond the first and second slots 85, 86. In this way, the heads 33 help to secure the implement 80 to the frame 12. The grass bag 80 is then pivoted about the first and second extension members 31, 32 until the hole 87 in the third attachment bracket 84 is positioned concentrically with the opening 38 in the frame 12. The pin 52 is then inserted through the hole 87 and the opening 38. The pin 52 may be secured in place by inserting a cotter pin 58 within the pin hole 60. It should be noted that additional assembly may be required to fully connect the grass bag 80 to the lawn and garden tractor 10. In particular, it may be necessary to attach a chute 89 of the grass bag 80 to a discharge portion 25 of the mower deck 24. This attachment may be by any means known in the art.

With continuing reference to FIGS. 1–2, 4–5 and 9–10, to detach the grass bag 80 from the back end 34 of the frame 12, the chute 89 is detached from the discharge portion 25 of the mower deck 24. Next, the cotter pin 58 is removed from the pin 52 and the pin 52 is then removed from the hole 87 and opening 38. Finally, the grass bag 80 is removed from the frame 12.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus comprising:
   a vehicle that comprises,
      A) a frame having first and second surfaces with first and second openings respectively, said first and second surfaces being laterally spaced;
      B) a plurality of wheels operatively connected to said frame;
      C) an engine operatively mounted to said frame for use in providing locomotion to at least one of said plurality of wheels, said vehicle adapted to be drivable without an implement; and,
      D) first and second extension members extending from said first and second surfaces of said frame; and,
   said implement comprising,
      A) a main body portion; and
      B) first and second laterally spaced attachment brackets operatively connected to said main body and having first and second holes and first and second slots respectively, said first and second slots being adapted to selectively receive said first and second extension members respectively, said implement capable of pivoting above and below said frame; and,
   an implement attachment apparatus comprising,
      A) first and second pins, said first and second holes of said implement and said first and second openings of said frame selectively receiving said first and second pins respectively; and,
      B) securing means for securing said first and second pins in place.

2. The apparatus of claim 1 wherein,
   said first and second surfaces of said frame are substantially parallel and laterally spaced a distance D1; and,
   said first and second attachment brackets have inside surfaces that are substantially parallel and are laterally spaced a distance D2 where distance D2 is substantially equal to distance D1.

3. The apparatus of claim 2 wherein said first and second extension members are substantially collinear, each of said first and second extension members further comprising:

a head.

4. The apparatus of claim 3 wherein, each of said first and second extension members extend out from said first and second surfaces of said frame a distance T1 before said head is located; and, said first and second attachment brackets have a thickness T2 in the area of said first and second slots, said thickness T2 being less than or equal to said distance T1.

5. The apparatus of claim 1 wherein said first and second holes are positioned between said main body and said first and second slots respectively.

6. The apparatus of claim 5 wherein said first and second slots are oriented at an angle A with respect to a centerline CL of said attachment brackets and said angle A is between 5° and 60°.

7. The apparatus of claim 1 wherein said first and second pins each have a pin hole, said securing means comprising:

first and second cotter pins that fit within said pin holes within said first and second pins.

8. The apparatus of claim 2 wherein said implement is a front bumper and said first and second extension members extend from said first and second surfaces of a front end of said frame.

9. The apparatus of claim 8 wherein said vehicle is a lawn and garden tractor that further comprises:

a mower deck having at least one cutting blade and being supported from said frame; and, wherein said engine also for use in rotating said at least one cutting blade.

10. A method of attaching an implement to a vehicle, the method comprising the steps of:

providing a vehicle that comprises a frame having first and second surfaces with first and second openings respectively, a plurality of wheels operatively connected to said frame, an engine for use in providing locomotion to at least one of said plurality of wheels, and first and second extension members extending from said first and second surfaces of said frame, said first and second surfaces being laterally spaced, said vehicle adapted to be drivable without an implement;

providing said implement that comprises a main body portion and first and second attachment brackets having first and second holes and first and second slots respectively, said first and second attachment brackets being laterally spaced;

providing an implement attachment apparatus that comprises first and second pins and securing means for securing said first and second pins in place;

positioning the implement such that said first slot receives said first extension member and said second slot receives said second extension member;

pivoting the implement about said first and second extension members until said first hole in said implement is oriented concentrically with said first opening in said frame and said second hole in said implement is oriented concentrically with said second opening in said frame, said implement capable of pivoting above and below said frame;

inserting said first pin within said first hole in said implement and said first opening in said frame;

inserting said second pin within said second hole in said implement and said second opening in said frame; and, securing said first and second pins into place.

11. The method of claim 10 further comprising the steps of:

de-securing said first and second pins;

removing said first pin from said first hole in said implement and said first opening in said frame;

removing said second pin from said second hole in said implement and said second opening in said frame;

moving said implement such that said first extension member on said frame is removed from said first slot in said implement and said second extension member on said frame is removed from said second slot in said implement; and, removing said implement away from said vehicle.

* * * * *